(12) United States Patent
Hasnain et al.

(10) Patent No.: US 12,426,027 B2
(45) Date of Patent: Sep. 23, 2025

(54) ULTRA LOW LATENCY

(71) Applicant: HEWLETT PACKARD ENTERPRISE DEVELOPMENT LP, Spring, TX (US)

(72) Inventors: Farhan Hasnain, Santa Clara, CA (US); Deven Patel, Santa Clara, CA (US); Eldad Perahia, Park City, UT (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 362 days.

(21) Appl. No.: 18/309,353

(22) Filed: Apr. 28, 2023

(65) Prior Publication Data

US 2024/0365301 A1 Oct. 31, 2024

(51) Int. Cl.
*H04W 72/0453* (2023.01)
*H04W 76/15* (2018.01)

(52) U.S. Cl.
CPC ....... *H04W 72/0453* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2020/0304167 A1* | 9/2020 | Kwon | H04B 1/50 |
| 2021/0084711 A1 | 3/2021 | Park et al. | |
| 2021/0184707 A1* | 6/2021 | Hasnain | H04B 1/0053 |
| 2021/0212118 A1 | 7/2021 | Lu et al. | |
| 2024/0088929 A1* | 3/2024 | Holland | H04B 1/10 |

OTHER PUBLICATIONS

Ahmed Nasrallah et al, Ultra-Low Latency (ULL) Networks: a Comprehensive Survey Covering the IEEE TSN Standard and Related ULL Research, Mar. 2018, 60 Pgs.
Cailian Deng et al, IEEE 802.11be—Wi-Fi 7: New Challenges and Opportunities, Aug. 3, 2020, 30 Pgs.
Xiyang Lan et al, Enhanced Multilink Single-Radio Operation for the Next-Generation IEEE 802.11 BE Wi-Fi Systems, Oct. 6, 2022, 11 Pgs.

* cited by examiner

*Primary Examiner* — The Hy Nguyen
(74) *Attorney, Agent, or Firm* — Sheppard Mullin Richter & Hampton LLP

(57) ABSTRACT

Systems and methods for providing low latency connection by a network device is described herein. Upon receiving a request for a low latency connection from a client device, a lower frequency filter in a primary 6 GHz radio, a secondary 6 GHz radio and an upper frequency filter in the secondary 6 GHz radio may be enabled. A transition band between the lower frequency filter and the upper frequency filter may be enabled such that there is no interference between a primary frequency channel allowed by the lower frequency filter and a secondary frequency channel allowed by the upper frequency filter. An operating frequency channel of an existing communication session with the client device may be determined. Based on the operating frequency channel, the primary frequency channel and the secondary frequency channel may be determined to provide a first communication connection and a second communication connection to the client device.

20 Claims, 6 Drawing Sheets

ULTRA LOW LATENCY

BACKGROUND

The launch of new Wi-Fi protocols coupled with the allowance of using the 6 GHz spectrum for Wi-Fi usage enables many new use cases. Some of these use case scenarios are highly latency-sensitive, including gaming and a myriad of applications which will be a part of the next generation Digital Universe—the Metaverse. 802.11ax protocol brings in OFDMA (Orthogonal Frequency Division Multiple Access) with an inherent promise of reducing latency. Especially in the 6 GHz frequency band which spans ~1200 MHz of spectrum and channels with bandwidths up to 320 MHz, there is no legacy traffic including 802.11ac, 802.11n or Legacy OFDM (Orthogonal frequency division multiplexing). All of this results in incremental latency benefits.

802.11be or WiFi-7 introduces the concept of MLO (Multi-Link Operation) which allows a client to have multiple connections (on two or more channels) to an Access Point (AP) multi-link device (AP MLD). Recently, there have been efforts to use MLO to allow for multiple communication connections for client devices. There has also been efforts to allow for 5 GHz/6 GHz coexistence by using a smart split band filter architecture. Further there have been discussions of ultra-low latency and how IEEE 802 standards have been improved/developed to reduce latency to fulfill ultra-low latency requirements. However, there is a need for the "smart splitting" of the 6 GHz frequency band to increase the bandwidth, i.e., the use of multiple links per MLO, available for use by a client device to support "ultra-low latency" (ULL) communications.

BRIEF DESCRIPTION OF THE DRAWINGS

The present disclosure, in accordance with one or more various examples, is described in detail with reference to the following figures. The figures are provided for purposes of illustration only and merely depict typical or example examples. These illustrative examples are mentioned not to limit or define the disclosure, but to provide examples to aid understanding thereof. Additional examples are discussed in the Detailed Description, and further description is provided there.

Figure 1:
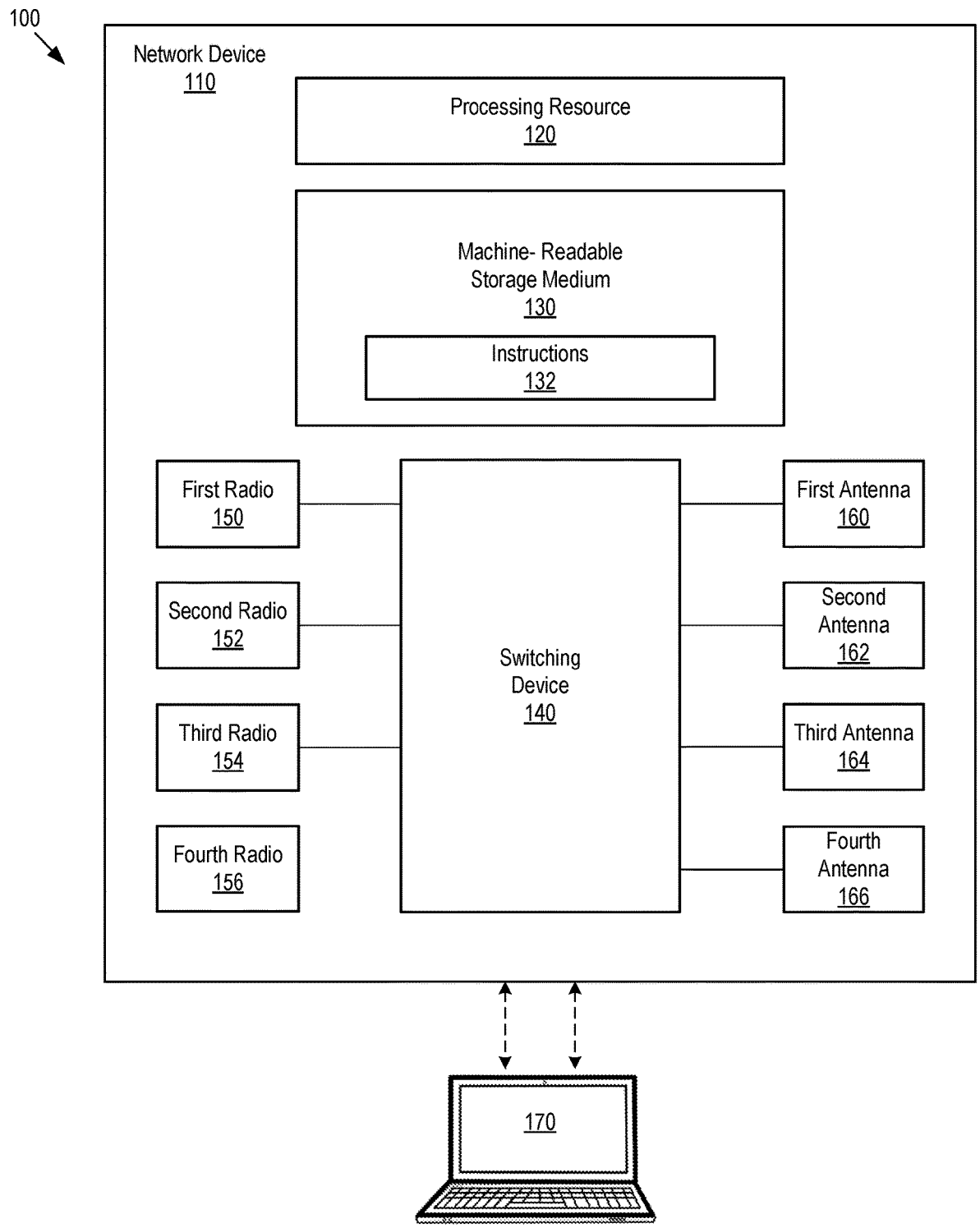
FIG. 1 is an example illustration of a network 100 for a network device to establish ULL communication connections in the 6 GHz frequency band, according to various examples described in the present disclosure.

The figures are not exhaustive and do not limit the present disclosure to the precise form disclosed.

DETAILED DESCRIPTION

Described herein is a new mode called the "ULL-Ultra-Low Latency" mode and the establishment of communication connections with newer client devices that can operate in the 6 GHz frequency band. The ULL mode relies on the use of a primary 6 GHz radio and a secondary 6 GHz radio on an AP MLD, to provide multiple links for use by a client device. A client device may already have an existing connection with the primary 6 GHz radio of an AP MLD. The client device may request to establish an ULL MLO connection. To establish an ULL MLO connection, the secondary 6 GHz radio may be enabled. Enabling the secondary 6 GHz radio may include switching from operating in scan mode to being operational in establishing a secondary connection for the client. The frequency channel for the secondary connection with the secondary 6 GHz radio may be determined based on the frequency channel of the existing connection with the primary 6 GHz radio to prevent or minimize interference in communication between the existing connection and the secondary connection.

To achieve an ULL MLO connection in the 6 GHz frequency band, in addition to catering to the 320 MHz channels in WiFi-7, two new 6 GHz filters may be used. The first new 6 GHz filter may be a 6 GHz narrowband filter (6G NB2) enabled in the primary 6 GHz radio. The new 6G NB2 may be enabled in the primary 6 GHz radio along with an existing 6 GHz wideband filter (6G WB1) that will continue to work like a first generation Ultra Tri-Band (UTB) filter. Both the new 6G NB2 and existing 6G WB1 filters may be utilized for UTB operation. The second new 6 GHz filter may be a 6 GHz wideband filter (6G WB2) enabled in the secondary 6 GHz radio. The 6G NB2 in the primary 6 GHz radio may allow signals in the 6 GHz sub-band covering 5945 MHz to 6265 MHz to pass through, while a 6G WB2 in the secondary 6 GHz radio may allow signals in the 6 GHZ sub-band covering 6345 MHz to 7125 MHz to pass through. A transition band may also be used to separate the 6 GHz sub-bands in the 6G NB2 filter and 6G WB2 filter, to ensure there is no interference between the communication connections established with the primary 6 GHz radio and the secondary 6 GHz radio since both 6 GHZ MLO links may work asynchronously with the client device(s). An 80 MHz sub-band may be used for the transition band, covering the gap between the 6G NB2 and the 6G WB2 from 6265 MHz to 6345 MHz. The choice of two sub-bands and an appropriate transition band is not limited to the choice made in this example. These and other features of the examples of the present disclosure are discussed herein.

FIG. 1 illustrates an example of a network 100 over which ULL MLO connections in the 6 GHz frequency band may be established in accordance with various examples of the present disclosure. In some examples, the network 100 may include a network device 110 and a client device 170. The client device 170 can be any computing device, such as a computer, mobile phone, tablet device, etc. The network device 110 may be implemented as an access point, router or switch. The network device may also be implemented as an Access Point (AP) multi-link device (MLD). The network device 110, in some examples, can be involved in a plurality of different client-server communications, including with client device 170, on which a plurality of sessions can occur simultaneously. The network device 110 may include a processing resource 120 and a machine-readable medium 130. The machine-readable medium 130 may include (i.e., encoded with) instructions 132 that are executable by the processing resource 120 of the network device 110 to implement functionalities described herein in relation to instructions 132. While not shown in FIG. 1, the network device 110 may be configured to connect various computing components in a network, such as one or more client devices, including client device 170, a network controller, an access point, and a server. The server may include or be associated with a database or cache (hereinafter "database") which stores attributes of particular client devices, servers, and access control lists or policies associated with the client device 170, which connect to a network via the access point. In some examples, the client device 170 can access the internet, wirelessly, through Wi-Fi (e.g., IEEE 802.11), Bluetooth (e.g., IEEE 802,15,1), or cellular connection (e.g., long-term evolution, 5th generation cellular networks, etc.) to wirelessly access the server through the network device 110. The server can implement software and/or hardware, such as web servers, application server, communications server, database server, etc. The server can access the internet through Wi-Fi, Bluetooth, phone line, or LAN/WLAN network interface. In other examples, the network device 110 can be an enterprise intranet (e.g., a private network) and the client device 170 can access the enterprise intranet, wirelessly, through the network device 110 to access data files or other enterprise data. In some cases, the network device 110 can be a network link (e.g., Wi-Fi, Ethernet port, router, switch, etc.) that allows a plurality of computing components to communicate with each other. The network controller and the access point can be configured to allow computing components in a network such as the client device 170 and the server to connect through the network device 110. In some examples, the network device 110 can establish a client-client communication between the client device 170 and other client devices.

In the example of FIG. 1, the network device 110 may engage in any network data transmission operations, including, but not limited to, switching, routing, bridging, or a combination thereof. In some examples, network device 110 may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform examples of the technology/ies disclosed herein, including, but not limited to: processors, memories, display devices, input devices, communications equipment, etc. It should be understood by one of ordinary skill in the art that network device 110 may be any suitable type(s) of network devices made by any suitable manufacturer(s).

In the example of FIG. 1, network device 110 may include a switching device 140, first radio 150, second radio 152, third radio 154, fourth radio 156, first antenna 160, second antenna 162, third antenna 164, and fourth antenna 166. In some examples, switching device 140 may be connected to the first radio 150, second radio 152, third radio 154, fourth radio 156, first antenna 160, second antenna 162, third antenna 164, and fourth antenna 166. In some examples, switching device 140 may include one or more switches which are connected to one or more of the first radio 150, second radio 152, third radio 154, fourth radio 156, first antenna 160, second antenna 162, third antenna 164, and fourth antenna 166. In some examples, switching device 140 may include one or more filters which are connected to one or more of first radio 150, second radio 152, third radio 154, fourth radio 156, first antenna 160, second antenna 162, third antenna 164, and fourth antenna 166.

In some examples, each of first radio 150, second radio 152, third radio 154 and fourth radio 156 may operate at one or more frequency bands which conform one or more IEEE standards (e.g., 802.11ax). In some examples, first radio 150 may operate at one or more frequency channels in the 2.4 GHz frequency band. In some examples, second radio 152 may operate at one or more frequency channels in the 5 GHz frequency band. In some examples, third radio 154 may operate at one or more frequency channels in the 6 GHz frequency band. In some examples, fourth radio 156 may operate as a general scanning radio by default. It will be understood by one skilled in the art that first radio 150, second radio 152 and third radio 154 may operate at any suitable frequency band(s) and conform to any suitable type(s) of wireless communication standards, now known and later developed. Moreover, although FIG. 1 shows network device 110 comprising four radios, it should be understood by one skilled in the art that network device 110 may comprise any suitable number of radios.

In some examples, network device 110 may also include one or more antennas, such as first antenna 160, second antenna 162, third antenna 164, and fourth antenna 166. In some examples, each antenna may transmit and/or receive directional signals, omnidirectional signals, or a combination thereof. In examples described herein, a "directional" signal refers to a signal which radiates more strongly in one or more directions as compared to one or more other directions along an azimuth plane (i.e., horizontal plane), whereas an "omnidirectional" signal refers to a signal which radiates equally in all directions along an azimuth plane. In some examples, each antenna may comprise a phased array antenna. In examples described herein, a "phased array antenna" refers to an array of antennas which can create a directional signal which can be electronically steered to point in different directions without moving the antennas. In such examples, a phased array antenna may comprise an array of directional and/or omnidirectional antennas which can focus RF energy towards specific spatial directions. It will be understood by one skilled in the art that an antenna may comprise any suitable type(s) of antenna, now known and later developed. Moreover, although FIG. 1 shows network device 110 comprising four antennas, it should be understood by one skilled in the art that network device 110 may comprise any suitable number of antennas.

Figure 2:
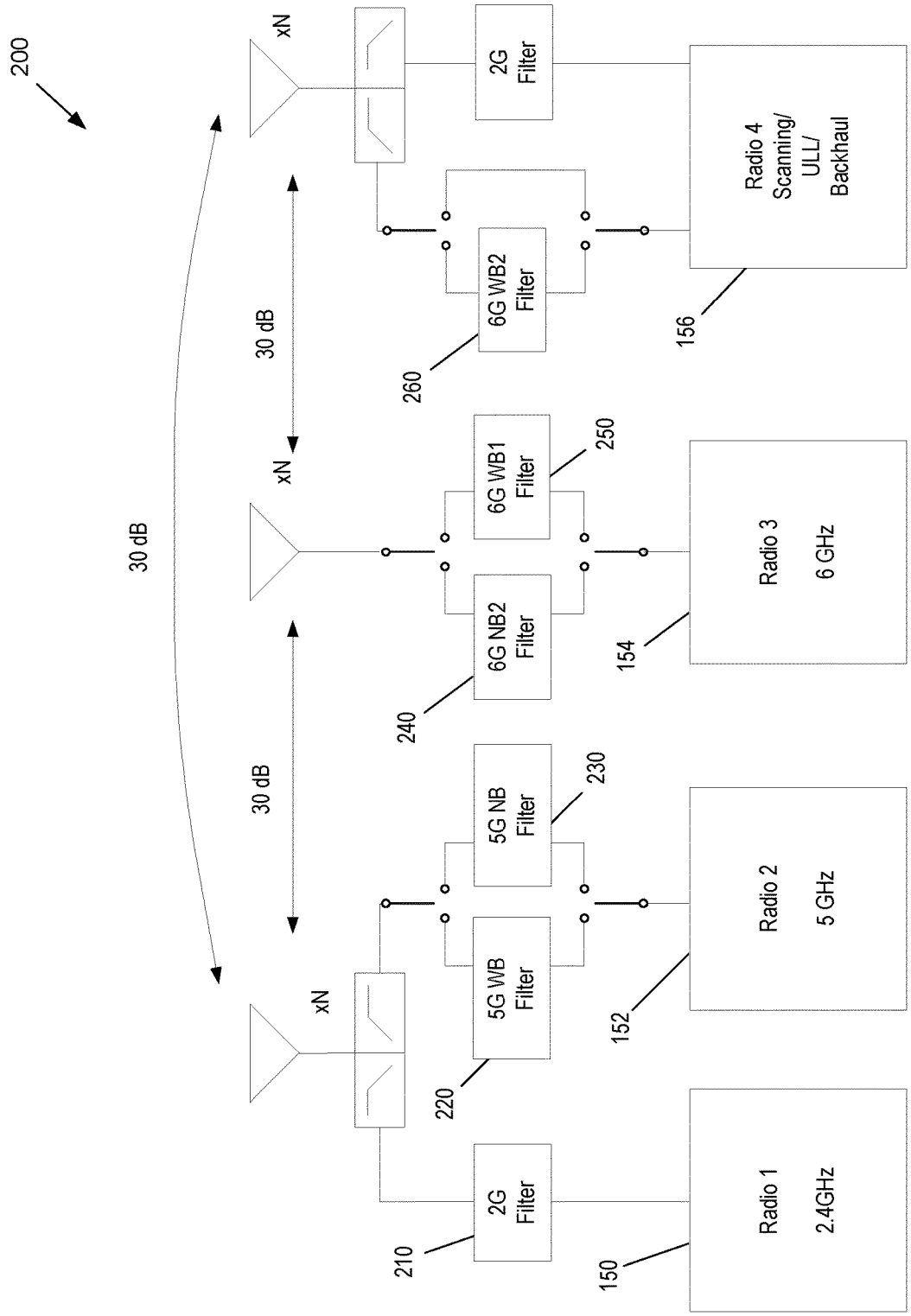
FIG. 2 is an example illustration of a radio architecture 200 in a network device to establish ULL communication connections in the 6 GHz frequency band, according to various examples described in the present disclosure.

FIG. 2 illustrates an example radio architecture 200 in a network device over which ULL MLO connections in the 6 GHz frequency band may be established in accordance with various examples of the present disclosure. The radio architecture 200 may be associated to a network device, such as the network device 110 of FIG. 1.

In some examples, each of first radio 150, second radio 152, third radio 154 and fourth radio 156 may operate at one or more frequency bands which conform one or more IEEE standards (e.g., 802.11ax). In the example of FIG. 2, first radio 150 may operate at one or more frequency channels in the 2.4 GHz frequency band, second radio 152 may operate at one or more frequency channels in the 5 GHz frequency band, third radio 154 may operate at one or more frequency channels in the 6 frequency GHz band, and fourth radio 156 may operate as a general scanning radio by default. The fourth radio 156 may be switched from operating in scan mode to operating as a secondary 6 GHz radio to supplement the third radio 154 which may act as the primary 6 GHz radio. The fourth radio 156 may be switched to act as the secondary 6 GHz radio when establishing ULL MLO connections in the 6 GHz frequency band for a client device, such as client device 170 of FIG. 1. It will be understood by one skilled in the art that first radio 150, second radio 152 and third radio 154 may operate at any suitable frequency band(s) and conform to any suitable type(s) of wireless communication standards, now known and later developed. Moreover, although FIG. 1 shows network device 110 comprising four radios, it should be understood by one skilled in the art that network device 110 may comprise any suitable number of radios.

In some examples, instructions, such as instructions 132 of FIG. 1, may be configured to select one or more filters to be applied to each of the first radio 150, second radio 152, third radio 154 and fourth radio 156, wherein each filter allows a particular range of frequency bands to pass through. In the example of FIG. 2, a 2 GHz filter 210 may be applied to the first radio 150 to allow frequency channels in the 2.4 GHz frequency band. In the example of FIG. 2, two 5 GHz filters 220 and 230 may be applied to the second radio 152 to allow frequency channels in the 5 GHz frequency band. Each of the 5 GHz filters 220 and 230 may allow a particular range of frequency channels in the 5 GHz frequency band through the second radio 152. The 5 GHz filter 220 may allow a range of frequency channels in the 5 GHz frequency band that is different from the range of frequency channels in the 5 GHz frequency band that is allowed by the 5 GHz filter 230. In the example of FIG. 2, two 6 GHz filters 230 and 240 may be applied to the third radio 154 to allow frequency channels in the 6 GHz frequency band. Each of the 6 GHz filters 240 and 250 may allow a particular range of frequency channels in the 6 GHZ frequency band through the third radio 154. In the example of FIG. 2, the fourth radio 156 may be switched from operating in scan mode as a general scanning radio to operating as a secondary 6 GHz radio to supplement the third radio 154 which may act as the primary 6 GHz radio. The fourth radio 156 may be switched to act as the secondary 6 GHz radio when establishing ULL MLO connections in the 6 GHz frequency band for a client device, such as client device 170 of FIG. 1. After the fourth radio 156 has been switched to operate as a secondary 6 GHz radio, a 6 GHz filter 260 may be applied to the fourth radio 156 to allow frequency channels in the 6 GHz frequency band. The 6 GHZ filter 260 may allow a particular range of frequency channels in the 6 GHz frequency band through the fourth radio 156. Each of the 6 GHz filters 240, 250 and 260 may allow a different range of frequency channels in the 6 GHz frequency band. Allowing different ranges of frequency channels in the 6 GHz frequency band to the third radio 154 and the fourth radio 156 may prevent or minimize interference in ULL MLO communications with client devices.

In some examples, each of the filters, i.e., 2 GHz filter 210, 5 GHz filters 220 and 230, and 6 GHz filters 240, 250 and 260, may be selected by a switching device, such as switching device 140 of FIG. 1. In some examples, each filter may be selected in response to instructions received by the network device 110 from a controller device. For example, the instructions received by the network device 110 from the controller device may indicate a frequency channel in the 6 GHz frequency band which corresponds to one of the 6 GHz filters 240, 250 or 260, and the 6 GHz filter 240, 250 or 260 may be selected in response to the indicated channel.

Figure 3:
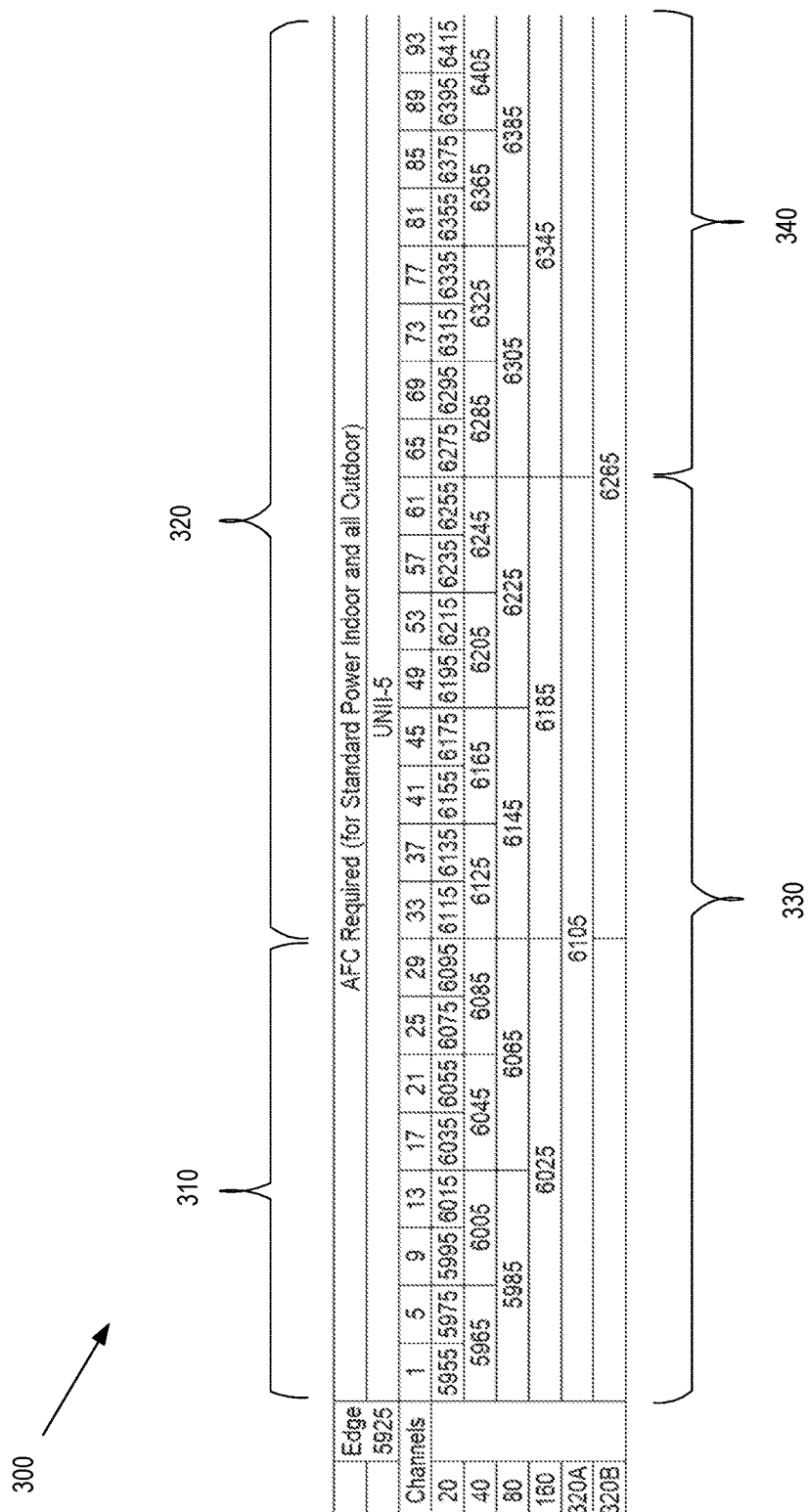
FIG. 3 is an example illustration of a chart 300 of frequency channels in the 6 GHz frequency band to be used to establish ULL communication connections, according to various examples of the present disclosure.

FIG. 3 illustrates an example chart 300 of frequency channels over which ULL MLO connections in the 6 GHz frequency band may be established in accordance with various examples of the present disclosure. In the example of FIG. 3, the filters 310, 320, 330 and 340 may each allow a particular range of frequency channels in the 6 GHz frequency band. It should be understood by one skilled in the art that each filter 310, 320, 330 and 340 may allow frequency channels to pass in the 6 GHz frequency band that are not shown in FIG. 3. Filter 310 may be considered as a 6 GHz narrowband filter catering to existing 160 MHz channels in WiFi-6 and WiFi-7, allowing a 6 GHz frequency band in the range of 5945 MHz to 6105 MHz to pass. Filter 320 may be considered as a 6 GHZ wideband filter catering to existing 1020 MHz channels in WiFi-6 and WiFi-7, allowing a 6 GHz frequency band in the range of 6105 MHz to 7125 MHz to pass. Filter 330 may be considered as a 6 GHz narrowband filter catering to new 320 MHz channels in WiFi-7, allowing a 6 GHz frequency band in the range of 5945 MHz to 6265 MHz to pass. Filter 340 may be considered as a 6 GHz wideband filter catering to new 780 MHz channels in WiFi-7, allowing a 6 GHz frequency band in the range of 6345 MHz to 7125 MHz to pass. The gap of frequency channels between filter 330 and filter 340, from the range of 6265 MHz to 6345 MHz, may be considered as a transition band. It should be understood by one skilled in the art that each 6 GHz filter 310, 320, 330, and 340 may allow different ranges of frequency channels to pass in the 6 GHz frequency band, and each 6 GHz filter 310, 320, 330 and 340, along with the transition band, is not limited to the ranges described above.

In some examples, the filters 310 and 320 may be configured to the third radio 154 of FIGS. 1 and 2 by default. To establish ULL MLO connections in the 6 GHz frequency band for a client device, instructions may be configured to switch a radio, such as the fourth radio 156 of FIGS. 1 and 2, from operating in scan mode to operating as a secondary 6 GHz radio. The fourth radio 156 may supplement the third radio 154 which may act as the primary 6 GHz radio. The instructions may select filter 330 to be applied to the third radio 154 and select filter 340 to be applied to the fourth radio 156. Each of the third radio 154 and the fourth radio 156 may allow a different range of frequency channels in the 6 GHz frequency band to pass through. Applying different filters, each with different, nonoverlapping ranges of frequency channels in the 6 GHz frequency band, to the third radio 154 and the fourth radio 156 may prevent or minimize interference in ULL MLO communications with client devices.

Figure 4:
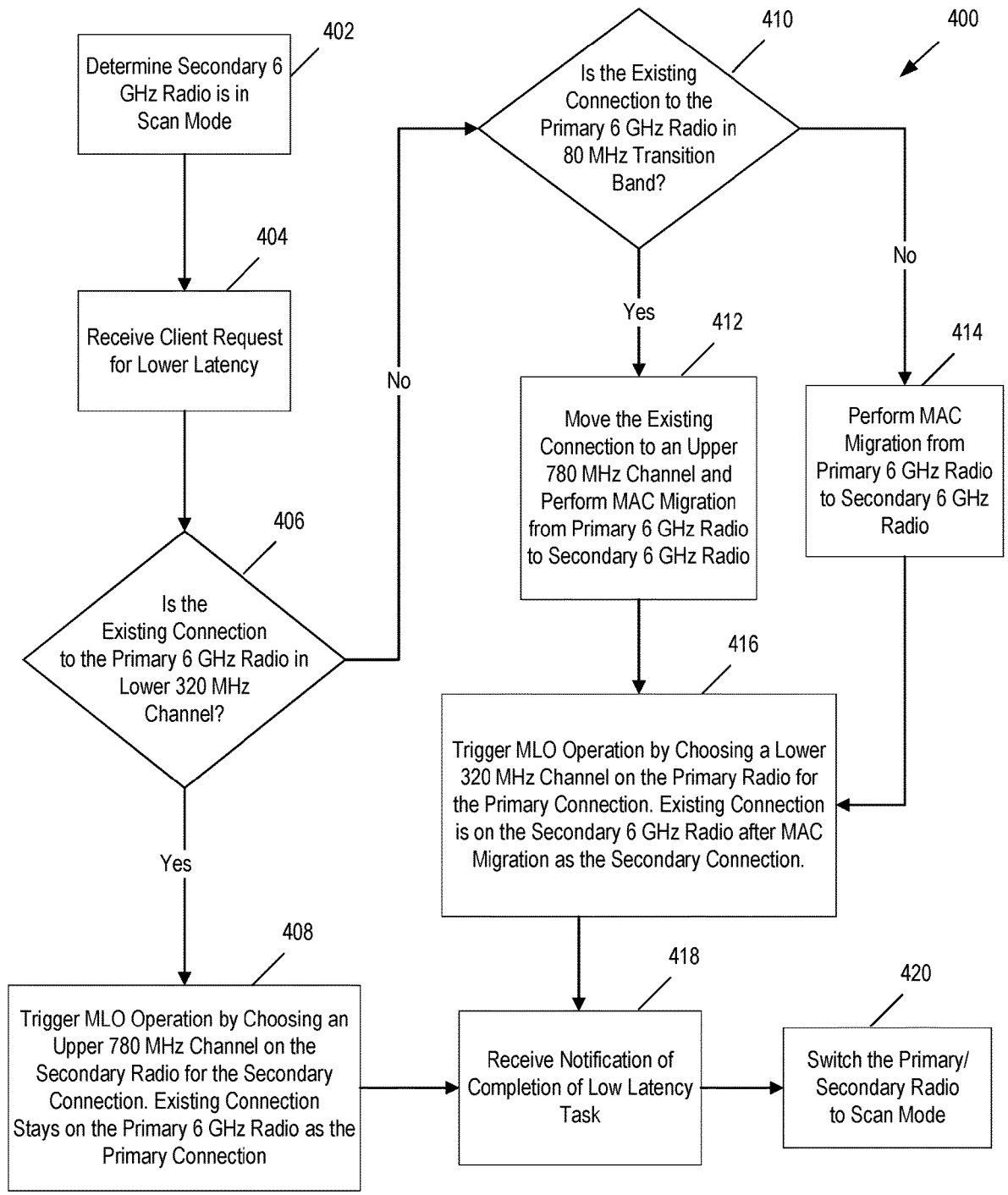
FIG. 4 is an example illustration of a process 400 to establish ULL communication connections, according to various examples of the present disclosure.

FIG. 4 illustrates an example illustration of a process 400 to establish ULL communication connections in accordance to various examples of the present disclosure. In some examples, the process 400 may be executed, for example, by the processing resource 120 of network device 110 of FIG. 1. In other examples, the process 400 may be implemented as the processing resource 120 of network device 110 of FIG. 1.

At step 402 of FIG. 4, the processing resource 120 may determine that the secondary 6 GHz radio is in scan mode. The network device may include a plurality of radios, such as first radio 150, second radio 152, third radio 154 and fourth radio 156 of FIG. 1. The first radio 150 may operate at one or more frequency channels in the 2.4 GHz frequency band, second radio 152 may operate at one or more frequency channels in the 5 GHz frequency band, third radio 154 may operate at one or more frequency channels in the 6 frequency GHz band, and fourth radio 156 may operate as a general scanning radio by default. The fourth radio 156 may be switched from operating in scan mode to operating as a secondary 6 GHz radio to supplement the third radio 154 which may act as the primary 6 GHz radio. The fourth radio 156 may be switched to act as the secondary 6 GHz radio when establishing ULL MLO connections in the 6 GHz frequency band for a client device, such as client device 170 of FIG. 1. The fourth radio 156 may be determined to be in scan mode.

At step 404 of FIG. 4, the processing resource 120 of network device 110 may receive a request from a client device requesting for lower latency. A request for lower latency may be considered as a request for a low latency connection, an ultra-low latency (ULL) connection, a ULL MLO connection, etc. The request may be from a client device, such as client device 170 of FIG. 1. In one example, the client device may have an existing communication connection with the network device before the network device receives a request for a low latency connection from the client device. In another example, the network device may receive a request for a low latency connection from the client device before establishing a communication connection with the client device.

A request for a low latency connection may include a request to establish multiple communication connections to the network device in the 6 GHz frequency band. The network device may be an Access Point (AP) multi-link device (MLD). The network device may establish multiple communication connections with the client device on two or more frequency channels in the 6 GHz frequency band. The network device may establish multiple communication connections with the client device using two or more radios. Each radio may have a unique filter applied to it, with each filter allowing a different range of frequency channels in the 6 GHz frequency band to pass through. Many variations are possible.

After receiving the request for a low latency connection, a secondary 6 GHZ radio may be enabled in the network device. The fourth radio 156 may be switched from operating in scan mode as a general scanning radio to operating as the secondary 6 GHZ radio. The secondary 6 GHz radio may be used as a supplement to the primary 6 GHz radio in the network device, such as the third radio 154.

Upon enabling the secondary 6 GHz radio, filters, such as filter 330 and 340 of FIG. 3, may be applied to the primary 6 GHz radio and the secondary 6 GHz radio, respectively. By applying different filters to the primary 6 GHz radio and the secondary 6 GHz radio, each radio may allow a different and nonoverlapping range of frequency channels in the 6 GHz frequency band to pass. This may prevent or minimize interference in ULL MLO communications with the client device.

At step 406 of FIG. 4, the processing resource 120 of network device 110 may determine if the client device has an existing communication connection to the primary 6 GHz radio that is in the lower 320 MHz frequency channels in the 6 GHz frequency band. In this scenario, the client device may have an existing communication connection with the network device before the network device receives a request for a low latency connection from the client device. The existing communication connection may be through the primary 6 GHz radio using an existing frequency channel in the 6 GHz frequency band. It may be determined if the existing frequency channel being used for the existing communication connection is within the lower 320 MHz frequency channels in the 6 GHz frequency band. The lower 320 MHz frequency channels may include the range of frequency channels in the filter applied to the primary 6 GHz radio, such as filter 330 of FIG. 3. Filter 330 may cater to new 320 MHz channels in WiFi-7, allowing a 6 GHz frequency band in the range of 5945 MHz to 6265 MHz to pass. If the existing frequency channel being used for the existing communication connection is within the lower 320 MHz frequency channels, then proceed to step 408. Otherwise, proceed to step 410.

At step 408 of FIG. 4, the processing resource 120 of network device 110 may trigger MLO operation and choose an upper 780 MHz frequency channel in the 6 GHz frequency band on the secondary 6 GHz radio. When the existing frequency channel of the existing communication connection is within the lower 320 MHz frequency channels, then the existing communication connection may be kept. The existing communication connection may be considered as the primary communication connection, using the same existing frequency channel, now referred to as the primary frequency channel.

A second frequency channel may be chosen from the upper 780 MHz frequency channels in the 6 GHz frequency band. The second frequency channel may be used to establish a second communication connection with the client device through the secondary 6 GHz radio. The upper 780 MHz frequency channels may include the range of frequency channels in the filter applied to the secondary 6 GHz radio, such as filter 340 of FIG. 3. Filter 340 may cater to new 780 MHz channels in WiFi-7, allowing a 6 GHz frequency band in the range of 6345 MHz to 7125 MHz to pass. The second frequency channel may be chosen from any available frequency channel in the filter of upper 780 MHz frequency channels in the 6 GHz frequency band.

At step 410 of FIG. 4, the processing resource 120 of network device 110 may determine if the client device has an existing communication connection to the primary 6 GHz radio that is in a 80 MHz transition band. The 80 MHz transition band may include a range of frequency channels in the 6 GHz frequency band that is in between the lower 320 MHz frequency channels and the upper 780 MHz frequency channels. In one example, the lower 320 MHz frequency channels may include the range of 5945 MHz to 6265 MHz in the 6 GHz frequency band. The upper 780 MHz frequency channels may include the range of 6345 MHz to 7125 MHz in the 6 GHz frequency band. The transition band may include the frequency channels in between the lower 320 MHz frequency channels and the upper 780 MHz frequency channels, consisting of the range of 6265 MHz to 6345 MHz. If the existing frequency channel being used for the existing communication connection is within the transition band, then proceed to step 412. Otherwise, proceed to step 414.

At step 412 of FIG. 4, the processing resource 120 of network device 110 may move the existing communication connection to a frequency channel from the upper 780 MHz frequency channels. Determining that the existing frequency channel for the existing communication connection to the primary 6 GHz radio is a frequency channel within the transition band, a frequency channel from the 780 MHz frequency channels may be chosen to replace the existing frequency channel. Any available frequency channel from the 780 MHz frequency channels may be chosen to replace the existing frequency channel. The chosen frequency channel from the 780 MHz frequency channels may be considered the secondary frequency channel.

The existing communication connection may be moved from the existing frequency channel in the primary 6 GHz radio to the secondary frequency channel in the secondary 6 GHz radio. The existing communication connection may be moved by performing media access control (MAC) migration. The existing communication connection may be considered the secondary communication connection, using the secondary frequency channel from the secondary 6 GHz radio.

At step 414 of FIG. 4, the processing resource 120 of network device 110 may move the existing communication connection from the primary 6 GHz radio to the secondary 6 GHz radio. Determining that the existing frequency channel for the existing communication connection to the primary 6 GHz radio is not a frequency channel within the transition band may therefore suggest that the existing frequency channel is a frequency channel from the 780 MHz frequency channels. The existing communication connection may be moved from the primary 6 GHz radio to the secondary 6 GHz radio, using the same existing frequency channel from the 780 MHz frequency channels. The existing communication connection may be moved from the primary 6 GHz radio to the secondary 6 GHz radio because of the filters being applied to the primary 6 GHz radio and the secondary 6 GHz radio. The filter for the primary 6 GHz radio may allow frequency channels from the 320 MHz frequency channels while the secondary 6 GHZ radio may allow frequency channels from the 780 MHz frequency channels. The existing communication connection may be moved from the primary 6 GHz radio to the secondary 6 GHz radio by performing MAC migration. The existing communication connection may be considered the secondary communication connection, using the existing frequency channel from the secondary 6 GHz radio. The existing frequency channel may be considered the secondary frequency channel.

At step 416 of FIG. 4, the processing resource 120 of network device 110 may trigger MLO operation and choose a lower 320 MHz frequency channel in the 6 GHZ frequency band on the primary 6 GHz radio. With the existing communication connection being moved from the primary 6 GHz radio to the secondary 6 GHz radio as the secondary communication connection, using a secondary frequency channel from the upper 780 MHz frequency channels, an additional communication connection may be established on the primary 6 GHz radio. To establish the additional communication connection, a primary frequency channel may be chosen from the lower 320 MHz frequency channels in the 6 GHz frequency band. The primary frequency channel may be used to establish a second communication connection with the client device through the primary 6 GHZ radio. The lower 320 MHz frequency channels may include the range of frequency channels in the filter applied to the primary 6 GHz radio, such as filter 330 of FIG. 3. Filter 330 may cater to new 320 MHz channels in WiFi-7, allowing a 6 GHz frequency band in the range of 5945 MHz to 6265 MHz to pass. The primary frequency channel may be chosen from any available frequency channel in the filter of upper 780 MHz frequency channels in the 6 GHz frequency band. The second communication connection, using the primary frequency channel in the primary 6 GHz radio, may be considered the primary communication connection.

Establishing the primary communication connection to the primary 6 GHZ radio using the primary frequency channel and the secondary communication connection to the secondary 6 GHz radio using the secondary frequency channel may provide the client with multiple, low latency connections to the network device.

At step 418 of FIG. 4, the processing resource 120 of network device 110 may receive a notification that the low latency task by the client device is completed. The client may request for low latency connections for various reasons. Upon establishing multiple, low latency connections for the client device upon receiving a request for low latency connections, the client device may maintain its multiple, low latency connections for as long as it needs. When the client device no longer needs the multiple, low latency connections it has to the network device, it may send a report or notification to the network device indicating that it no longer needs the multiple, low latency connections. The client device may also choose to terminate all but one of its low latency connections to the network device and the network device may determine that the client device no longer needs multiple, low latency connections. Upon determining the client device no longer needs the multiple, low latency connections, the network device may determine which one of the multiple, low latency connections to maintain while disconnecting or terminating the others. In one example, the network device may disconnect or terminate the low latency connections that the client device has already terminated or disconnected from. In another example, the network device may maintain the low latency connection to the primary 6 GHz radio while terminating the other low latency connections. In another example, the network device may maintain the low latency connection to the secondary 6 GHz radio, while terminating the other low latency connections.

At step 420 of FIG. 4, the processing resource 120 of network device 110 may switch one of the primary 6 GHz radio or the secondary 6 GHz radio to scan mode. Upon terminating all but one of the multiple, low latency connections with the client device, the network device may determine which radio between the primary 6 GHz radio and the secondary 6 GHz radio to switch to scan mode. If the low latency connection to the primary 7 6 GHz radio is maintained, then the secondary 6 GHz radio may be switched to scan mode to operate as a general scanning radio. If the low latency connection to the secondary 6 GHz radio is maintained, then the primary 6 GHz radio may be switched to scan mode to operate as a general scanning radio. The filter applied to the 6 GHz radio that is switched to scan mode to operate as a general scanning radio may be disabled. In one example, the filter applied to the 6 GHz radio that maintains the low latency connection to the client device may be maintained. In another example, the filter applied to the 6 GHz radio that maintains the low latency connection to the client device may be disabled and replaced with another filter of frequency channels in the 6 GHz frequency band, such as filter 310 and/or 320 of FIG. 3. Many variations are possible.

For simplicity of description, the process 400 is described as being performed with respect to a single request for low latency connection from a single client device. It should be appreciated that, in a typical example, the processing resource 120 of network device 110 may receive multiple requests for low latency connection from multiple client devices, simultaneously and/or in short succession of one another. In some examples, the processing resource 120 may perform many, if not all, of the steps in process 400 on a plurality of low latency connection requests from a plurality of client devices as low latency connection requests are received or obtained.

As explained, the process 400 may provide a solution in establishing ULL communication connections for client devices. Using multiple 6 GHz radios to establish multiple low latency connections for a client device may ensure less or no interference between the multiple low latency connections for the client device, thus ensuring minimal delays.

Figure 5:
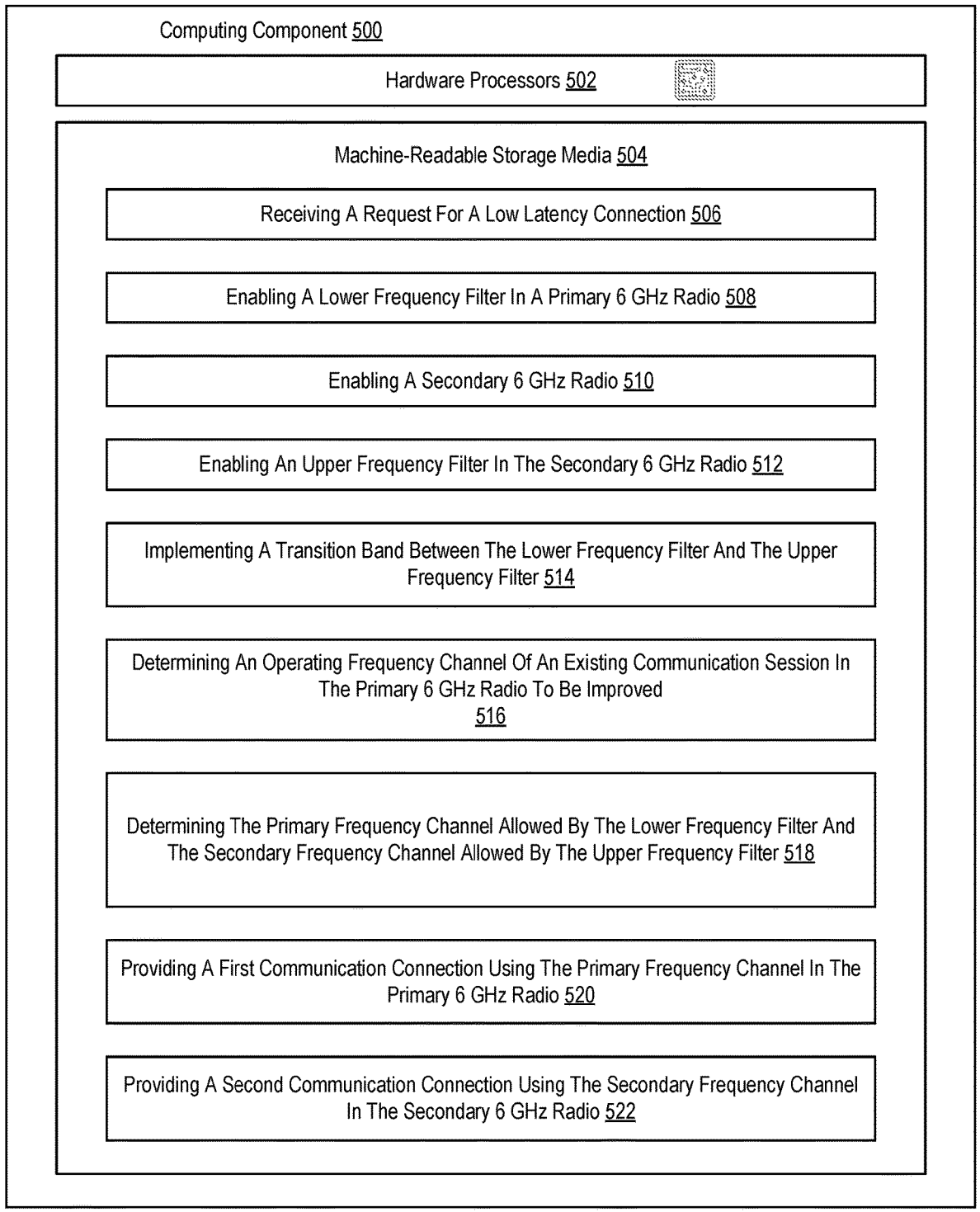
FIG. 5 is an example computing component that includes one or more hardware processors and machine-readable storage media storing a set of machine-readable/machine-executable instructions that, when executed, cause the one or more hardware processors to perform an illustrative method of providing ULL communication connections, according to various examples of the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 500 may be implemented as the computing component 110 of FIG. 1, the network device 200 of FIG. 2, and the process 400 of FIG. 4. FIG. 5 summarizes and further elaborates on some aspects previously described.

At step 506, the hardware processor(s) 502 may execute machine-readable/machine-executable instructions stored in the machine-readable storage media 504 for a network device to receive a request for a low latency connection. The request for a low latency connection may be from a client device. In one example, the client device may have an existing communication connection with the network device before the network device receives a request for a low latency connection from the client device. In another example, the network device may receive a request for a low latency connection from the client device before establishing a communication connection with the client device.

A request for a low latency connection may include a request to establish multiple communication connections to the network device in the 6 GHz frequency band. The network device may be an Access Point (AP) multi-link device (MLD). The network device may establish multiple communication connections with the client device on two or more frequency channels in the 6 GHz frequency band. The network device may establish multiple communication connections with the client device using two or more radios, with each radio allowing a different filter of frequency channels in the 6 GHz frequency band. Many variations are possible.

At step 508, the hardware processor(s) 502 may execute machine-readable/machine-executable instructions stored in the machine-readable storage media 504 to enable a lower frequency filter in a primary 6 GHz radio in the network device. The network device may include a plurality of radios. Each of the plurality of radios may be designated with a particular function. In one example, a network device may include: a first radio used as the primary 2.4 GHz radio to establish communication connections with devices in the 2.4 GHz frequency band, a second radio used as the primary 5 GHz radio to establish communication connections with devices in the 5 GHz frequency band, a third radio used as the primary 6 GHz radio to establish communication connections with devices in the 6 GHz frequency band, and a fourth radio used as a general scanning radio. The fourth radio may also be used as a secondary 6 GHz radio to establish communication connections with devices in the 6 GHz frequency band.

After receiving the request for a low latency connection, a lower frequency filter may be enabled in the primary 6 GHz radio of the network device to allow signals in a first 6 GHz sub-band to pass through. The first 6 GHz sub-band may include frequency channels from 5945 MHz to 6265 MHz. The choice of the range of the frequency channels in the first 6 GHz sub-band is not limited to 5945 MHz to 6265 MHz.

At step 510, the hardware processor(s) 502 may execute machine-readable/machine-executable instructions stored in the machine-readable storage media 504 to enable a secondary 6 GHz radio in the network device. The secondary 6 GHZ radio may be one of the plurality of radios included in the network device. In one example, the secondary 6 GHz radio may be a general scanning radio in the network device.

After receiving the request for a low latency connection, the secondary 6 GHz radio may be enabled in the network device. Enabling the secondary 6 GHz radio may include switching the general scanning radio from operating in scan mode to operating in communication mode. Enabling the secondary 6 GHz radio may allow signals in the 6 GHz frequency band to pass through.

At step 512, the hardware processor(s) 502 may execute machine-readable/machine-executable instructions stored in the machine-readable storage media 504 to enable an upper frequency filter in the secondary 6 GHz radio in the network device. After enabling the secondary 6 GHz radio to operate in communication mode, the secondary 6 GHz radio may allow signals in the 6 GHz frequency band to pass through. An upper frequency filter may be enabled in the secondary 6 GHz radio to allow signals in a second 6 GHz sub-band to pass through. The second 6 GHz sub-band may include frequency channels from 6345 MHz to 7125 MHz. The choice of the range of the frequency channels in the second 6 GHz sub-band is not limited to 6345 MHz to 7125 MHz.

Using two 6 GHz radios, with each radio filtering frequency channels in a different 6 GHz sub-band, may allow the network device to establish multiple communication connections with the same device while also preventing or minimizing interference in communication between each of the multiple communication connections.

At step 514, the hardware processor(s) 502 may execute machine-readable/machine-executable instructions stored in the machine-readable storage media 504 to enable a transition band between the lower frequency filter and the upper frequency filter. A transition band may be implemented to prevent or minimize interference in communications between a communication connection in the primary 6 GHz radio and a communication connection in the secondary 6 GHz radio. The transition band may be a 80 MHz sub-band. The 80 MHz sub-band may include frequency channels between the lower frequency filter of the first 6 GHz sub-band and the upper frequency filter of the second 6 GHz sub-band. The 80 MHz sub-band may include frequency channels from 6265 MHz to 6345 MHz. The choice of the range of the frequency channels in the transition band is not limited to 6265 MHz to 6345 MHz.

At step 516, the hardware processor(s) 502 may execute machine-readable/machine-executable instructions stored in the machine-readable storage media 504 to determine an operating frequency channel of an existing communication connection with the client device. The network device may have an existing communication connection with client device. The existing communication connection may be established in the primary 6 GHz radio of the network device. The request for a low latency connection from the client device to the network device may include a request to improve the existing communication connection in the primary 6 GHz radio. The operating frequency of the existing communication connection in the primary 6 GHz radio may be determined.

At step 518, the hardware processor(s) 502 may execute machine-readable/machine-executable instructions stored in the machine-readable storage media 504 to determine the primary frequency channel in the primary 6 GHz radio and the secondary frequency channel in the secondary 6 GHz radio. A primary frequency channel may be determined to be used in the primary 6 GHz radio. The primary frequency channel may be a frequency channel within the lower frequency filter enabled in the primary 6 GHz radio. The primary frequency channel may be used to establish a first communication connection between the network device and the client device in the primary 6 GHz radio. The first communication connection may replace the existing communication connection between the network device and the client device in the primary 6 GHz radio. A secondary frequency channel may be determined to be used in the secondary 6 GHz radio. The secondary frequency channel may be a frequency channel within the upper frequency filter enabled in the secondary 6 GHz radio. The secondary frequency channel may be used to establish a second communication connection between the network device and the client device in the secondary 6 GHz radio.

Determining the primary frequency channel in the primary 6 GHz radio may be based on the operating frequency channel of the existing communication connection. In one example, the operating frequency channel of the existing communication connection in the primary 6 GHz radio may be a frequency channel within the range of frequency channels in the lower frequency filter enabled in the primary 6 GHz radio. By determining the operating frequency channel is within the lower frequency filter, i.e., the 6 GHz sub-band of 5945 MHz to 6265 MHz, then the primary frequency channel may be determined to be the same frequency channel as the operating frequency channel. The secondary frequency channel in the secondary 6 GHz radio may be selected to be any available frequency channel in the upper frequency filter enabled in the secondary 6 GHz radio. The upper frequency filter may include frequency channels in the 6 GHz sub-band of 6345 MHz to 7125 MHz.

Determining the secondary frequency channel in the secondary 6 GHz radio may be based on the operating frequency channel of the existing communication connection. In one example, the operating frequency channel of the existing communication connection in the primary 6 GHz radio may be a frequency channel within the range of frequency channels in the upper frequency filter enabled in the secondary 6 GHz radio. By determining the operating frequency channel is within the upper frequency filter, i.e., the 6 GHz sub-band of 6345 MHz to 7125 MHz, then the secondary frequency channel may be determined to be the same frequency channel as the operating frequency channel. The primary frequency channel in the primary 6 GHz radio may be selected to be any available frequency channel in the lower frequency filter enabled in the primary 6 GHz radio. The lower frequency filter may include frequency channels in the 6 GHz sub-band of 5945 MHz to 6265 MHz.

By determining the operating frequency channel of the existing communication connection to be a frequency channel within the range of frequency channels in the transition band, one of two actions may occur. In a first scenario, upon determining the operation frequency channel of the existing communication connection to be within the range of frequency channels in the transition band, a new first frequency channel may be selected from available frequency channels within the lower frequency filter, i.e., the 6 GHz sub-band of 5945 MHz to 6265 MHz. The existing communication connection may be moved from the operating frequency channel to the new first frequency channel in the primary 6 GHz radio. The existing communication connection may be moved by media access control (MAC) migration. The new first frequency channel may be the primary frequency channel to be used to establish a first communication connection to the client device in the primary 6 GHz radio. The secondary frequency channel in the secondary 6 GHz radio may be selected to be any available frequency channel in the upper frequency filter enabled in the secondary 6 GHz radio. The upper frequency filter may include frequency channels in the 6 GHz sub-band of 6345 MHz to 7125 MHz. The secondary frequency channel may be used to establish a second communication connection to the client device in the secondary 6 GHz radio.

In a second scenario, upon determining the operation frequency channel of the existing communication connection to be within the range of frequency channels in the transition band, a new first frequency channel may be selected from available frequency channels within the upper frequency filter, i.e., the 6 GHz sub-band of 6345 MHz to 7125 MHz. The existing communication connection may be moved from the operating frequency channel to the new first frequency channel in the secondary 6 GHz radio. The existing communication connection may be moved by media access control (MAC) migration. The new first frequency channel may be the secondary frequency channel to be used to establish a first communication connection to the client device in the secondary 6 GHz radio. The primary frequency channel in the primary 6 GHz radio may be selected to be any available frequency channel in the lower frequency filter enabled in the primary 6 GHz radio. The lower frequency filter may include frequency channels in the 6 GHz sub-band of 5945 MHz to 6265 MHz. The primary frequency channel may be used to establish a second communication connection to the client device in the primary 6 GHz radio.

At step 520, the hardware processor(s) 502 may execute machine-readable/machine-executable instructions stored in the machine-readable storage media 504 to provide a first communication connection using the primary frequency channel in the primary 6 GHz radio. Once the primary frequency channel within the lower frequency filter of frequency channels enabled in the primary 6 GHz radio is determined, a new first communication connection may be established. The network device may replace the existing communication connection with the newly established first communication connection. To replace the existing communication connection with the newly established first communication connection, the existing communication connection may be moved by MAC migration.

At step 522, the hardware processor(s) 502 may execute machine-readable/machine-executable instructions stored in the machine-readable storage media 504 to provide a second communication connection using the secondary frequency channel in the secondary 6 GHz radio. Once the secondary frequency channel within the upper frequency filter of frequency channels enabled in the secondary 6 GHz radio is determined, a new second communication connection may be established. The network device may replace the existing communication connection with the newly established second communication connection. To replace the existing communication connection with the newly established second communication connection, the existing communication connection may be moved by MAC migration.

Subsequently, the hardware processor(s) 502 may execute machine-readable/machine-executable instructions stored in the machine-readable storage media 504 to receive a notification of the client device terminating the low latency connection to the network device. Upon receiving the notification for terminating the low latency connection, either the primary 6 GHz radio or the secondary 6 GHz radio may be disabled. Disabling the primary 6 GHZ radio may disconnect or terminate the primary communication connection to the client device. Disabling the secondary 6 GHz radio may disconnect or terminate the secondary communication connection to the client device. In one example, the network device may disable the primary 6 GHz radio when the primary frequency channel is the same as the original existing frequency channel to the client device. In another example, the network device may disable the secondary 6 GHz radio when the secondary frequency channel is the same as the original existing frequency channel to the client device. In another example, the network device may disable the secondary 6 GHz radio when the original existing frequency channel for the original existing communication connection to the client device was a frequency channel within the transition band. Many variations are possible.

Furthermore, the hardware processor(s) 502 may receive multiple requests for low latency connections from other client devices, simultaneously and/or in in short succession of one another, and repeat the aforementioned steps for each of the requests received, until requests for low latency connections are no longer being received from a client device.

Figure 6:
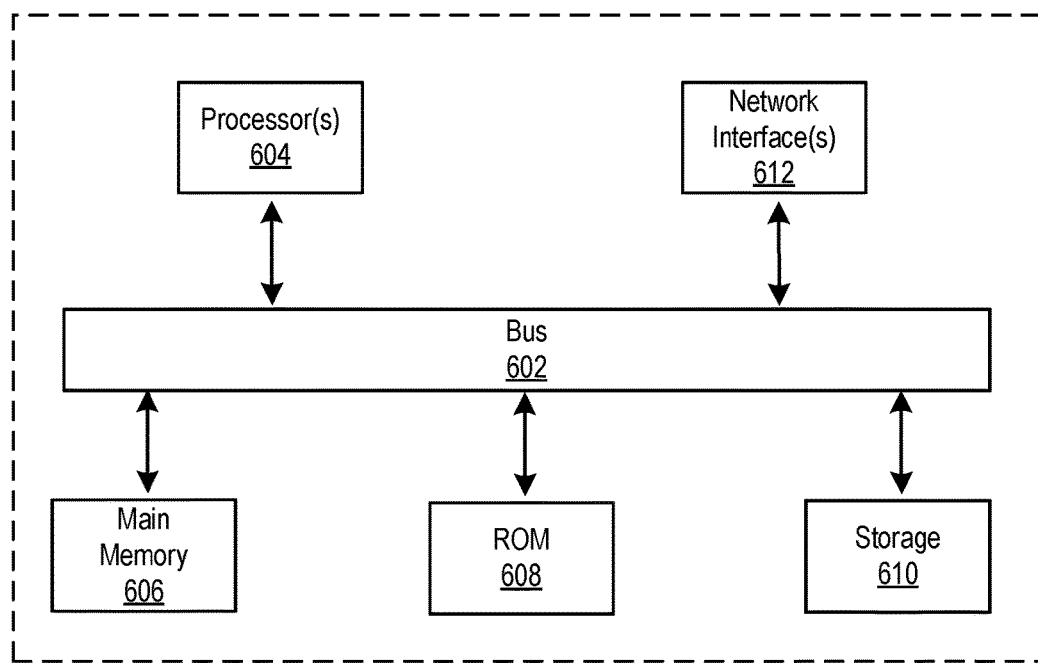
FIG. 6 illustrates a block diagram of an example computer system in which various examples of the present disclosure may be implemented.

FIG. 6 illustrates a block diagram of an example computer system 600 in which various of the examples described herein may be implemented. For example, the functionality of one or more of the elements, network functions, etc. illustrated in any of FIGS. 1-5 may be implemented or effectuated by computer system 600. The computer system 600 can include a bus 602 or other communication mechanism for communicating information, one or more hardware processor(s) 604 coupled with bus 602 for processing information. Hardware processor(s) 604 may be, for example, one or more general purpose microprocessors.

The computer system 600 may also include a main memory 606, such as a random access memory (RAM), cache and/or other dynamic storage devices, coupled to bus 602 for storing information and instructions to be executed by hardware processor(s) 604. Main memory 606 may also be used for storing temporary variables or other intermediate information during execution of instructions to be executed by the hardware processor(s) 604. Such instructions, when stored in storage media accessible to hardware processor(s) 604, render computer system 600 into a special-purpose machine that is customized to perform the operations specified in the instructions.

The computer system 600 may further include a read only memory (ROM) 608 or other static storage device coupled to the bus 602 for storing static information and instructions for hardware processor(s) 604. A storage device 610, such as a magnetic disk, optical disk, or USB thumb drive (Flash drive), etc., can be provided and coupled to bus 602 for storing information and instructions.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAS, firmware and/or program logic which in combination with the computer system 600 that causes or programs computer system 600 to be a special-purpose machine. According to one example, the techniques herein may be performed by computer system 600 in response to the hardware processor(s) 604 executing one or more sequences of one or more instructions contained in main memory 606. Such instructions may be read into main memory 606 from another storage medium, such as storage device 610. Execution of the sequences of instructions contained in main memory 606 can cause the hardware processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media can include, for example, optical or magnetic disks, such as storage device 610. Volatile media can include dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media can participate in transferring information between non-transitory media. For example, transmission media can include coaxial cables, copper wire and fiber optics, including the wires that comprise bus 602. Transmission media can also take the form of acoustic or light waves, such as those generated during radio-wave and infra-red data communications.

Computer system 600 can further include at least one network interface 612, such as a network interface controller module (NIC), network adapter, or the like, or a combination thereof, coupled to the bus 602 for connecting the computer system 600 to at least one network. Network interface 612 may provide a two-way data communication coupling to one or more network links that are connected to one or more local networks. For example, network interface 612 may be an integrated services digital network (ISDN) card, cable modem, satellite modem, or a modem to provide a data communication connection to a corresponding type of telephone line. As another example, network interface 612 may be a local area network (LAN) card to provide a data communication connection to a compatible LAN (or WAN component to communicate with a WAN). Wireless links may also be implemented. In any such implementation, network interface 612 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 612, which carry the digital data to and from computer system 600, are example forms of transmission media.

The computer system 600 can send messages and receive data, including program code, through the network(s), network link and network interface 612. In the Internet example, a server might transmit a requested code for an application program through the Internet, the ISP, the local network and the network interface 612. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for providing a low latency connection by a network device, comprising:
    receiving, from a client device, a request for a low latency connection to the network device;
    enabling a lower frequency filter in a primary 6 GHz radio;
    enabling a secondary 6 GHz radio;
    enabling an upper frequency filter in the secondary 6 GHz radio;
    implementing a transition band between the lower frequency filter and the upper frequency filter such that there is no interference between a primary frequency channel allowed by the lower frequency filter in the primary 6 GHz radio and a secondary frequency channel allowed by the upper frequency filter in the secondary 6 GHz radio;
determining an operating frequency channel of an existing communication session with the client device in the primary 6 GHz radio to be improved by the requested low latency connection;
determining, based on the operating frequency channel, the primary frequency channel allowed by the lower frequency filter in the primary 6 GHz radio and the secondary frequency channel allowed by the upper frequency filter in the secondary 6 GHz radio;
providing, to the client device, a first communication connection using the primary frequency channel in the primary 6 GHz radio; and
providing, to the client device, a second communication connection using the secondary frequency channel in the secondary 6 GHz radio.

2. The method of claim 1, wherein the lower frequency filter is in a 320 MHz frequency range of 5945 MHz to 6265 MHz.

3. The method of claim 1, wherein the upper frequency filter is in a 780 MHz frequency range of 6345 MHz to 7125 MHz.

4. The method of claim 1, wherein the transition band is a 80 MHz frequency range of 6265 MHz to 6345 MHz.

5. The method of claim 1, wherein determining the primary frequency channel allowed by the lower frequency filter in the primary 6 GHz radio and the secondary frequency channel allowed by the upper frequency filter in the secondary 6 GHz radio comprises:
in response to determining the operating frequency channel of the existing communication session with the client device is within the lower frequency filter, determining the primary frequency channel in the primary 6 GHz radio is the same as the operating frequency channel; and
selecting an available frequency channel allowed by the upper frequency filter in the secondary 6 GHz radio to be the secondary frequency channel.

6. The method of claim 1, wherein determining the primary frequency channel allowed by the lower frequency filter in the primary 6 GHz radio and the secondary frequency channel allowed by the upper frequency filter in the secondary 6 GHz radio comprises:
in response to determining the operating frequency channel of the existing communication session with the client device is within the upper frequency filter, determining the secondary frequency channel in the secondary 6 GHz radio is the same as the operating frequency channel; and
selecting an available frequency channel allowed by the lower frequency filter in the primary 6 GHz radio to be the primary frequency channel.

7. The method of claim 1, wherein determining the primary frequency channel allowed by the lower frequency filter in the primary 6 GHz radio and the secondary frequency channel allowed by the upper frequency filter in the secondary 6 GHz radio comprises:
in response to determining the operating frequency channel of the existing communication session with the client device is within the transition band, selecting an available lower frequency channel allowed by the lower frequency filter in the primary 6 GHz radio to be the primary frequency channel;
performing media access control (MAC) migration by moving the existing communication session from the operating frequency channel to the primary frequency channel; and
selecting an available upper frequency channel allowed by the upper frequency filter in the secondary 6 GHz radio to be the secondary frequency channel.

8. The method of claim 1, wherein determining the primary frequency channel allowed by the lower frequency filter in the primary 6 GHz radio and the secondary frequency channel allowed by the upper frequency filter in the secondary 6 GHz radio comprises:
in response to determining the operating frequency channel of the existing communication session with the client device is within the transition band, selecting an available upper frequency channel allowed by the upper frequency filter in the secondary 6 GHz radio to be the secondary frequency channel;
performing media access control (MAC) migration by moving the existing communication session from the operating frequency channel to the secondary frequency channel; and
selecting an available lower frequency channel allowed by the lower frequency filter in the primary 6 GHz radio to be the primary frequency channel.

9. The method of claim 1, further comprising:
receiving, from the client device, a notification of the client device terminating the low latency connection to the network device;
disabling the secondary 6 GHz radio in response to the primary frequency channel in the primary 6 GHz radio being the same as the operating frequency channel.

10. The method of claim 1, further comprising:
receiving, from the client device, a notification of the client device terminating the low latency connection to the network device;
disabling the primary 6 GHz radio in response to the secondary frequency channel in the secondary 6 GHz radio being the same as the operating frequency channel.

11. The method of claim 1, further comprising:
receiving, from the client device, a notification of the client device terminating the low latency connection to the network device;
disabling the secondary 6 GHz radio in response to the operating frequency channel being within the transition band.

12. A computing system for low latency connection comprising:
one or more processors; and
a non-transitory computer readable medium including instructions that, when executed by the one or more processors, cause the one or more processors to perform operations of:
receiving, from a client device, a request for a low latency connection;
enabling a lower frequency filter in a primary 6 GHz radio;
enabling a secondary 6 GHz radio;
enabling an upper frequency filter in the secondary 6 GHz radio;
implementing a transition band between the lower frequency filter and the upper frequency filter such that there is no interference between a primary frequency channel allowed by the lower frequency filter in the primary 6 GHz radio and a secondary frequency channel allowed by the upper frequency filter in the secondary 6 GHz radio;

determining an operating frequency channel of an existing communication session with the client device in the primary 6 GHz radio to be improved by the requested low latency connection;

determining, based on the operating frequency channel, the primary frequency channel allowed by the lower frequency filter in the primary 6 GHz radio and the secondary frequency channel allowed by the upper frequency filter in the secondary 6 GHz radio;

providing, to the client device, a first communication connection using the primary frequency channel in the primary 6 GHz radio; and providing, to the client device, a second communication connection using the secondary frequency channel in the secondary 6 GHz radio.

13. The computing system of claim 12, wherein the lower frequency filter is in a 320 MHz frequency range of 5945 MHz to 6265 MHz.

14. The computing system of claim 12, wherein the upper frequency filter is in a 780 MHz frequency range of 6345 MHz to 7125 MHz.

15. The computing system of claim 12, wherein the transition band is a 80 MHz frequency range of 6265 MHz to 6345 MHz.

16. The computing system of claim 12, wherein determining the primary frequency channel allowed by the lower frequency filter in the primary 6 GHz radio and the secondary frequency channel allowed by the upper frequency filter in the secondary 6 GHz radio comprises:

in response to determining the operating frequency channel of the existing communication session with the client device is within the lower frequency filter, determining the primary frequency channel in the primary 6 GHz radio is the same as the operating frequency channel; and selecting an available frequency channel allowed by the upper frequency filter in the secondary 6 GHz radio to be the secondary frequency channel.

17. The computing system of claim 12, wherein determining the primary frequency channel allowed by the lower frequency filter in the primary 6 GHz radio and the secondary frequency channel allowed by the upper frequency filter in the secondary 6 GHz radio comprises:

in response to determining the operating frequency channel of the existing communication session with the client device is within the upper frequency filter, determining the secondary frequency channel in the secondary 6 GHz radio is the same as the operating frequency channel; and selecting an available frequency channel allowed by the lower frequency filter in the primary 6 GHz radio to be the primary frequency channel.

18. The computing system of claim 12, wherein determining the primary frequency channel allowed by the lower frequency filter in the primary 6 GHz radio and the secondary frequency channel allowed by the upper frequency filter in the secondary 6 GHz radio comprises:

in response to determining the operating frequency channel of the existing communication session with the client device is within the transition band, selecting an available lower frequency channel allowed by the lower frequency filter in the primary 6 GHz radio to be the primary frequency channel;

performing media access control (MAC) migration by moving the existing communication session from the operating frequency channel to the primary frequency channel; and selecting an available upper frequency channel allowed by the upper frequency filter in the secondary 6 GHz radio to be the secondary frequency channel.

19. The computing system of claim 12, wherein the medium further includes instructions that cause the one or more processors to perform operations of:

receiving, from the client device, a notification of the client device terminating the low latency connection;

disabling the secondary 6 GHz radio.

20. A non-transitory storage medium storing instructions that, when executed by at least one processor of a computing system, cause the computing system to perform a method comprising:

receiving, from a client device, a request for a low latency connection;

enabling a lower frequency filter in a primary 6 GHz radio;

enabling a secondary 6 GHz radio;

enabling an upper frequency filter in the secondary 6 GHz radio;

implementing a transition band between the lower frequency filter and the upper frequency filter such that there is no interference between a primary frequency channel allowed by the lower frequency filter in the primary 6 GHz radio and a secondary frequency channel allowed by the upper frequency filter in the secondary 6 GHz radio;

determining an operating frequency channel of an existing communication session with the client device in the primary 6 GHz radio to be improved by the requested low latency connection;

determining, based on the operating frequency channel, the primary frequency channel allowed by the lower frequency filter in the primary 6 GHz radio and the secondary frequency channel allowed by the upper frequency filter in the secondary 6 GHz radio;

providing, to the client device, a first communication connection using the primary frequency channel in the primary 6 GHz radio; and providing, to the client device, a second communication connection using the secondary frequency channel in the secondary 6 GHz radio.

* * * * *